US005840101A

United States Patent [19]

Keller

[11] Patent Number: 5,840,101

[45] Date of Patent: Nov. 24, 1998

[54] METHOD AND APPARATUS FOR TREATMENT OF AN ENDLESS WEB OF MATERIAL WITH VACUUM

[75] Inventor: Walter Keller, Willich, Germany

[73] Assignee: WET TEX Maschinenbau GmbH, Tönisvorst, Germany

[21] Appl. No.: 645,171

[22] Filed: May 13, 1996

Related U.S. Application Data

[63] Continuation-in-part of Ser. No. 542,389, Oct. 12, 1995.

[30] Foreign Application Priority Data

May 27, 1995 [DE] Germany ........................ 195 19 551.5

[51] Int. Cl.[6] ........................ B01D 19/00

[52] U.S. Cl. ........................ 95/258; 95/266; 95/288; 96/194; 96/201; 96/218

[58] Field of Search ........................ 8/151, 158; 68/18 R, 68/20; 95/266, 258, 261, 269, 288; 162/264, 278, 279, 348, 354, 363, 364; 96/193–195, 201, 208, 218

[56] References Cited

U.S. PATENT DOCUMENTS

| | | | |
|---|---|---|---|
| 4,329,201 | 5/1982 | Bolton | 162/198 |
| 4,398,996 | 8/1983 | Bolton et al. | 162/198 |
| 4,447,924 | 5/1984 | Bolton et al. | 8/151 |
| 5,419,391 | 5/1995 | Chan et al. | 165/159 |

FOREIGN PATENT DOCUMENTS

| | | | |
|---|---|---|---|
| SO-20 63 444 | 7/1972 | Germany . | |
| 28 12 966 A1 | 10/1979 | Germany . | |
| 28 14 196 A1 | 10/1979 | Germany . | |
| 27 27 971 C2 | 7/1983 | Germany . | |
| 83 09 479 U1 | 10/1983 | Germany . | |
| 36 44 323 A1 | 7/1988 | Germany . | |
| 3818600A1 | 12/1988 | Germany | 162/348 |
| 4124648A1 | 1/1993 | Germany | 162/348 |
| 42 11 055 A1 | 10/1993 | Germany . | |
| 35 11 950 C2 | 12/1993 | Germany . | |
| 4416645 | 5/1994 | Germany . | |
| 21 14 917 | 9/1983 | United Kingdom . | |
| WO85/03314 | 8/1985 | WIPO | 162/348 |

*Primary Examiner*—Robert Spitzer
*Attorney, Agent, or Firm*—Horst M. Kasper

[57] ABSTRACT

A method and an apparatus for the treatment of an endless web, wherein exhaust vapors, formed in a treatment chamber, are withdrawn together with returned gases with a vacuum from the treatment chamber and are led into a separator to be separated into gas and liquid. The gas is further heated in a vacuum generator and is then returned into the treatment zone, wherein the endless web is led in the treatment zone over rollers with heating devices.

19 Claims, 3 Drawing Sheets

METHOD AND APPARATUS FOR TREATMENT OF AN ENDLESS WEB OF MATERIAL WITH VACUUM

CROSS-REFERENCE TO RELATED APPLICATIONS

This application is a continuation-in-part application of another application filed Oct. 12, 1995 and bearing Ser. No. 08/542,389. The entire disclosure of this latter application, including the drawings thereof, is hereby incorporated in this application as if fully set forth herein.

BACKGROUND OF THE INVENTION

1. Field of the Invention

The invention relates to a method for a treatment of an endless web which is led within a treatment chamber over deflection rollers, wherein generated exhaust vapors are drawn off by way of a vacuum and are separated into gas and liquid, wherein the liquid is returned to the treatment casing.

2. Brief Description of the Background of the Invention Including Prior Art

According to the U.S. patent application, Ser. No. 08/542,389, filed Oct. 12, 1995, an endless web is led within a washing machine through a heated washing liquid. The gas-water mixture, formed within the washing machine, is then discharged to the outside and is then separated into a gaseous phase and a liquid phase. The liquid is returned to the washing machine. The hot gas is discharged unused. The thereby discharged heat energy is lost to the washing liquid in the washing machine, which represents a substantial cooling of the washing liquid with a high energy loss. The gas, exhausted into the open air, loads and impacts the environment. Upon suctioning the liquid by way of vacuum, a part of the liquid is transformed into a gaseous phase based on the decrease of the pressure in the vacuum and the therewith associated lowering of the boiling point of the liquid and said gaseous phase passes with the energy contained therein together with the remaining gas unused into the atmosphere. Up to now it has not been possible to make use of the energy contained in the gas with simple means.

The exhaust vapors generated during the drying of a continuous web are removed to the outside by ventilators or the like. Based on the removal of the exhaust vapors, external air, in particular cold air, is drawn in, whereby the drying effect is decreased and worsened. In particular, in case of use of drying cylinders, this step is disadvantageous because the drying cylinders are thereby substantially and strongly cooled.

SUMMARY OF THE INVENTION

1. Purposes of the Invention

It is an object of the present invention to dry a continuous web with an apparatus that avoids the disadvantages of the conventional constructions.

It is another object of the present invention to furnish a method and an apparatus with which the energy expanded is nearly completely recovered and reclaimed, where the treatment effect is improved, and where the drying effect is increased.

These and other objects and advantages of the present invention will become evident from the description which follows.

2. Brief Description of the Invention

According to the present invention, there is provided for a method of treatment of an endless web of textile material. The endless web is guided over one or several rotating rollers, disposed in series in advance moving direction of the endless web disposed within a treatment chamber for drying the endless web. The generated exhaust vapors are withdrawn. The withdrawn and generated exhaust vapors are separated in a separator into gas and liquid. The liquid resulting in the separator is returned into the treatment chamber. The gases resulting in the separator are passed to a vacuum generator. The gases, released by the vacuum generator at a discharge region of the endless web in the area of a last rotating roller, are returned into a treatment region.

The returned gases can be sprayed with nozzles onto the endless web. The returned gases can be passed in a direction oppositely to an advance moving direction of the endless web from the discharge region of the endless web up to an entrance region of the endless web through a heated flow channel surrounding the rotating rollers and sealed towards the outside. The returned gases, after exiting from this flow channel, can be withdrawn together with the generated exhaust vapors.

Rollers guiding the endless web can be operated without supplying heat to the rotating rollers. Gas released from the vacuum generator can be entered into a heat exchanger furnished with a water feed. Hot liquid can be generated by transferring heat from the gas released from the vacuum generator to the water. Generated exhaust air can be vented into the ambient open air.

Heat can be generated at the rotating rollers guiding the endless web for drying the endless web. The endless web in an entrance region of the endless web can be deflected onto a front rotating roller. The endless web can be passed over an exhaust tube. Exhaust vapors can be sucked off from the endless web with the exhaust tube.

A rotating roller can be formed as a suction roller. Exhaust vapors can be axially withdrawn from the suction roller. Returned gases can be entered into an axial region of the last rotating roller.

An apparatus for treating an endless web of textile material led over deflection rollers within a treatment chamber, includes a plurality of deflection rollers disposed within the treatment chamber for guiding and treating the endless web. A first rotating roller is disposed in series as seen in advance moving direction of the endless web between the deflection rollers for guiding and treating the endless web and for drying of the endless web. An exhaust device is connected to the treatment chamber for discharging formed exhaust gases. An exhaust line is connected to the exhaust device. A separator is connected to the exhaust line for withdrawing the formed exhaust gases. A gas exhaust line is connected to a head of the separator. A liquid line is connected to a floor of the separator. A pump is disposed in the liquid line and feeds a connection of the liquid line to the treatment chamber. A vacuum generator is connected to the gas exhaust line. A gas return line is connected to the vacuum generator and to the treatment chamber.

A distributor box with exit nozzles can be disposed at an end of the gas return line on a side of the treatment chamber. Exit openings of the exit nozzles can be directed onto the endless web. A second rotating roller can sequentially follow to the rotating roller. A heatable double-walled sheet metal jacket having baffles can be disposed inside the sheet metal jacket surrounding the first rotating roller at a distance and surrounding the second rotating roller at a distance and thereby forming a flow channel between the rotating rollers and the sheet metal jacket. A first lip seal can be furnished to the sheet metal jacket of the second rotating roller in a region of a discharge of the endless web. A second lip seal can be furnished to the sheet metal jacket of the second rotating roller at an input of an endless web entrance region of the second rotating roller. A third lip seal can be furnished to the sheet metal jacket of the second rotating roller at an output of an endless web exit region of the first rotating roller.

A second rotating roller can sequentially follow to the rotating roller, wherein the first rotating roller and the second rotating roller are formed as sieve rollers. The exhaust device can be coordinated to the endless web in a region of the first rotating roller. The exhaust device can be connected to the exhaust line through branch channels. One of the deflection rollers can be furnished between the first rotating roller and the second rotating roller in a lower part of the treatment chamber. An axial exhaust can be furnished to the first rotating roller. An axial feed can be furnished to the second rotating roller. A heatable, double-walled sheet metal jacket having baffles can be disposed inside the sheet metal jacket and can be adapted to the rotating rollers, thereby forming a flow channel in an upper part between the first rotating roller, the second rotating roller, and the sheet metal jacket, and said sheet metal jacket surrounding the first rotating roller and the second rotating roller at a distance. A floor tub can cover a lower part of the first rotating roller and of the second rotating roller. A branch line can branch off from the gas return line. The branch line can be led to the axial feed of the second rotating roller. A first valve can be placed in the gas return line and a second valve can be placed in the branch line. A distributor box can be disposed inside the sheet metal jacket.

A second branch line can branch off from the gas return line. The second branch line can be connected by way of a perforated tube to a floor of a heat exchanger. A fresh water feed can be connected to the heat exchanger for feeding fresh water to the heat exchanger. A distributor plate can have microfine openings for generating a fine distribution of the gas from the gas return line with the fresh water from the fresh water feed. A discharge line for hot liquid can be connected to the heat exchanger in a region of the distributor plate. An exhaust air line can be connected to the heat exchanger and led above the distributor plate into the ambient open air. A third branch line can branch off from the exhaust air line. A connection line can connect the third branch line to the gas return line.

The continuous web is guided over one or several rotating rollers, successively disposed in the advance moving direction of the continuous web, for the purpose of drying a textile web. The exhaust vapors are withdrawn by a vacuum generator and are led through a separator. The gases are led from the separator through a vacuum generator and are then returned from the discharge region of the continuous web from the last roller into the treatment region.

The gases, separated from the exhaust vapors, are led to the vacuum generator according to the method of the present invention.

Additional energy is to be expanded for the vacuum generator, for example, the required power for the motor, which can be between about 10 and 100 kW. Based on this additional energy, the gas is further heated in the vacuum generator based on the frictional energy losses. The return of the additionally heated gas improves not only the energy balance, but it results also in an improved treatment effect.

The gases, heated in the vacuum generator and returned into the treatment casing, are blown in the discharge region of the endless web, for example through nozzles, directly onto the endless web. The exhaust vapors, generated during the drying, are thereby led away from the surface of the continuous web, whereby the drying effect is improved.

If the returned gases, or parts thereof, are led opposite to the advance moving direction of the continuous web from the discharge region to the feed region of the continuous web through a heated flow channel, sealed toward the outside and surrounding the rollers, then the exhaust gases are blown off over the complete length of the flow channel from the continuous web, and after exiting from the flow channel the exhaust gases can be sucked off together with the gases, again by the vacuum generator. In addition, the flow channel improves the drying effect.

The required drying medium for the drying of the continuous web can be applied through the rollers and/or through the heated flow channel onto the continuous web. If heated rollers are employed, then a temperature balancing occurs within the flow channel, which is nearly equal to the temperature of the returned gases. The gases together with the exhaust vapors form an overheated vapor, which uses and absorbs in part the exhaust gases in order to be saturated. Also based on this step, the drying effect is substantially improved.

If the inner wall of a double-walled sheet metal jacket, forming the flow channel, is furnished with baffles, then turbulences are generated within the flow channel which effect a further improvement of the drying effect. A usable heated double-walled sheet metal jacket is described in the German patent document DE-P 44 16 645.1. Upon employing such a heated double-walled sheet metal jacket, the rotating rollers can remain unheated.

In case of a treatment of a continuous web of textile fabric, the gases and the exhaust vapors are jointly sucked off with suction tubes from the feed region of the continuous web, where the continuous web is led over the suction tubes.

In case of a treatment of a continuous web made of elastic textile fabric, of knitted textile or knitwear, then the rollers are formed as rotating suction rollers, sieve rollers, and/or perforated drums. The exhaust vapors and the gases can be drawn from a first suction roller through a sieve jacket of the roller from the continuous web into the interior of the roller and can then be axially discharged toward the outside. At the last roller, the returned gases can be fed, completely or in part, axially into the interior of the roller and then can be led through a sieve jacket from the inside to the outside, and across the continuous web into the flow channel. Also this step is advantageous relative to the drying of the continuous web. An advantageous construction of the suction roller is described in the U. S. patent application Ser. No. 08/542,389, filed Oct. 12, 1995.

In order to improve further the energy balance, it is disclosed according to the present invention that gases, withdrawn from the vacuum generator, are completely or partly led in a microfinely distributed form into a heat exchanger, furnished with a water feed, and the thereby generated hot liquid is fed completely or in part to a user, or is entered completely or in part into the treatment zone and the generated waste air is led completely or in part into the ambient open air.

During the treatment of the continuous web, a part of the treatment medium is lost. This loss has to be compensated by adding a fresh medium, for example, fresh washing water. The branched-off hot gas is passed in a fine dispersion into the liquid bath of the heat exchanger or directly into the treatment medium. The heat contained in the gas is nearly completely transferred to the liquid medium, is passed into the treatment zone, or is fed to another user. The remaining, substantially cooled air can be led into the ambient open air without hesitation. The remaining, substantially cooled air can also be completely or in part passed to the treatment zone.

An apparatus for performing the invention method starts with a treatment machine for treating the continuous web, where the continuous web is guided over deflection rollers within a treatment chamber, and wherein an exhaust device is connected to the treatment chamber for venting the forming exhaust vapors, wherein the generated gas-liquid mixture is withdrawn and separated. The present invention provides for the drying of a textile web in that one or several rotating rollers are disposed in series as seen in advance moving direction of the continuous web. An exhaust line is connected with a stripper, a separator or a collector for venting the exhaust vapors formed and the returned gases. The stripper, separator, or collector is furnished in its head with a gas exhaust line and is furnished in its floor with a liquid line. The gas exhaust line is connected with a vacuum generator, and the liquid line furnished with a pump is connected to a user. A gas return line is disposed between the vacuum generator and the treatment chamber.

A further feature of the present invention comprises that a branch line branches off from the gas return line coming from the vacuum generator. The branch line is led into the region of the floor of a heat exchanger furnished with a fresh water feed and furnished with a distributor plate with microporous openings. A discharge line for the hot liquid is furnished in the region of the distributor plate. An exhaust line is furnished above the distributor plate and leads into the ambient open air.

With the apparatus of the present invention, the method of the present invention can be accomplished in the most simple way.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
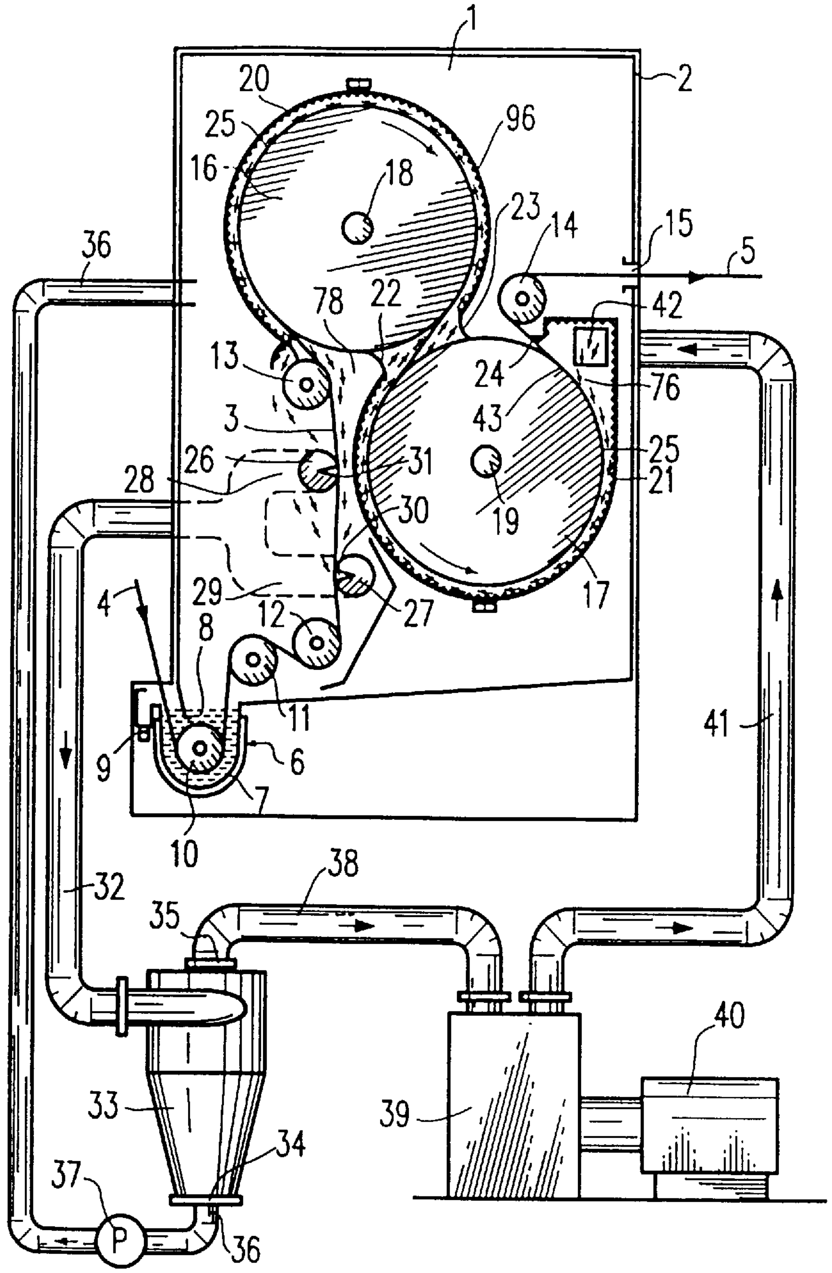
FIG. 1 is a view of a schematic diagram of the arrangement for treating woven textile fabrics with vacuum.

According to the present invention, there is provided for an apparatus for treating an endless web of textile material led over deflection rollers within a treatment chamber. A treatment machine for the treatment of an endless web is provided, where the endless web is led over deflection rollers within the treatment chamber. An exhaust device is connected to the treatment chamber for discharging the formed exhaust vapors. One or several rotating rollers 16, 17, 48, 52 are disposed successively in series as seen in advance moving direction of the endless web between the deflection rollers 10 through 14, 44, 45 for guiding and treating the endless web and for drying of the endless web. An exhaust line 32 is connected to a separator 33 for withdrawing the formed exhaust gases. The separator 33 is connected at its head to a gas exhaust line 38. The separator 33 is connected at its floor 34 to a liquid line 36. The gas exhaust line 38 is connected to a vacuum generator 39. The liquid line 36, furnished with a pump 37, is connected to a user. The gas return line 41 is disposed between the vacuum generator 39 and the treatment chamber 1.

An end of the gas return line 41 on the treatment side of the chamber can be furnished with a distributor box 42 with exit nozzles 43. Exit openings of the exit nozzles 43 can be directed onto the endless web 3. The rollers 16, 17 can be surrounded at a distance in each case by a heatable double-walled sheet metal jacket 20, 21 having baffles 96 disposed inside the sheet metal jacket 20, 21, thereby forming a flow channel 25 between the rollers 16, 17 the sheet metal jacket 20, 21. The sheet metal jacket 20 of the first roller 16 can be furnished with a lip seal 22 in a discharge region of the endless web 3. The sheet metal jacket 21 of the rear roller 17 can be furnished with a lip seal 23 at an input side entrance region. The sheet metal jacket 21 can be furnished with a lip seal 24 at an output side exit region of the endless web 3.

One or several exhaust pipes 26, 27 can be coordinated to the endless web 3 in a region of the first roller 16. The exhaust pipes 26, 27 can be connected to the exhaust line 32 through the branch channels 28, 29.

In an apparatus for treating an endless web of elastic knitted fabric, the rollers 48, 52 can be surrounded at a distance with a heatable, double-walled sheet metal jacket 46 having baffles disposed inside the sheet metal jacket 46 and adapted to the rollers 48, 52, thereby forming a flow channel 75 in the upper part between the rollers 48, 52 and the sheet metal jacket 46. The lower part of the rollers 48, 52 can be covered by a floor tub 58. A further deflection roller 44 can be provided between the rollers 48, 52 in the lower part. The rollers 48, 52 can be as suction rollers or sieve rollers. The front roller 48 can be furnished with an axial exhaust 51. The rear roller 52 can be furnished with an axial feed 54. A branch line 55 branches off from the gas return line 41. The branch line 55 can be led to the axial feed 54 of the roller 52. The gas return line 41 and the branch line 55 can in each case be furnished with a valve 56, 57.

A distributor box 42 can be disposed inside the sheet metal jacket 21 or, respectively, 46. A further branch line 63 can branch off from the gas return line 41. The further branch line 63 can enter by way of a perforated tube 64 into a floor of a heat exchanger 66 with a fresh water feed 67 and can be furnished with a distributor plate 69 having openings. A discharge line 73 for hot liquid can be furnished in a region of the distributor plate 69. An exhaust air line 70 can be furnished and led above the distributor plate 69 into the ambient open air. The distributor plate 69 can be furnished with microfine openings.

A branch line 71 can branch off from the exhaust air line 70. The branch line 71 can be furnished with a gas return line 41.

During the treatment, in particular the drying of a continuous web of woven textile fabrics, according to FIG. 1, an endless or continuous web 3 is guided and passed over deflection rollers 10 to 14 and, furthermore, over two non-heated rollers 16 and 17 through a treatment chamber 1 with insulated walls 2 as shown in FIG. 1. The feed end 4 of the continuous web 3 is entered into the treatment chamber 1 through a water lock 6, where the water lock 6 comprises a heatable double-walled casing 7 with a liquid filling 8 and an overflow 9. The water lock 6 furnishes a gas-tight separation of the outer area feeding in the continuous web 3 and the interior of the treatment chamber 1. A first deflection roller 10 for the endless web 3 is disposed within the liquid filling 8. The continuous web 3 winds around the deflection roller 10 and passes through the liquid filling 8 in the water lock 6. Furthermore, deflection rollers 11 through 13 are furnished. The deflection roller 11 deflects the continuous web 3 received from the deflection roller 10 disposed in the water lock 6. The deflection roller 12 deflects the continuous web 3 coming from deflection roller 11 and directs the continuous web 3 into an upwardly directed motion at a desired position in the treatment chamber 1. The deflection roller 13 receives the vertically upwardly moving continuous web 3 and directs it toward the surface of the roller 16. The two non-heated, rotating rollers 16 with roller axis 18 and the roller 17 with roller axis 19 follow to the deflection rollers 11, 12, 13 for the guiding and treating of the continuous web 3. The roller 16 is disposed substantially above the vertical upward motion of the continuous web 3 just described. The deflection angle of the roller 16 is preferably above 270 degrees. The diameter of the rollers 16 and 17 can be from about 3 to 10 times the diameter of one of the rollers 11, 12, 13 and is preferably from about 4 to 6 times the diameter of the rollers 11, 12, 13. The direction of rotation of the rollers 16 and 17 is preferably opposite such that the neighboring tangential directions of motion of the respective roller surfaces are running in the same direction. The deflection angle of the roller 17 is preferably above 270 degrees. The distance of the surface of the roller 16 from the surface of the roller 17 can be from about 0.03 times the diameter of roller 16 to 0.2 times the diameter of the roller 16 and is preferably from about 0.05 to 0.1 times the diameter of the roller 16. Heated rollers can be additionally employed or can be substituted for the rollers shown in the drawings. The discharge end 5 of the continuous web 3 is led over a further deflection roller 14 and further transported over a gas-tight opening 15, disposed on the discharge side, out of the treatment chamber 1. The rollers 16 and 17 are in each case surrounded by a heatable, double-walled sheet metal jacket 20 and 21 (according to the German patent document DE-P 44 16 645.1). The sheet metal jackets 20 and 21 form a sealed flow channel 25 with lip seals 22 through 24. The lip seal 24 is disposed in the discharge region of the continuous web 3 of the roller 17. The lip seal 24 seals the area of fluid input toward the continuous web 3 near the roller 14 and the sheet metal jacket 21. The lip seals 22 and 23 are disposed in the transition region of the continuous web 3 from the roller 16 to the roller 17. The lip seal 22 seals the area under the sheet metal jacket 21 relative to the roller surface of roller 16. The lip seal 23 seals the area under the sheet metal jacket 20 against the surface of the roller 17. The inner sides of the sheet metal jackets 20 and 21 exhibit baffles 96 (according to the German patent document DE-P 44 16 645.1). The baffles 96 preferably extend longitudinally in a direction parallel to the axes of the rollers 16, 17. The flow channel 25 is formed between the sheet metal jacket 20 and the continuous web 3 moving over the outer surface of the roller 16. The entrance end, where the continuous web 3 enters the flow channel 25, is opened. A flow channel 25 further extends between the sheet metal jacket 21 and the continuous web 3 running on the roller 17. In the area between the lip seal 22 and the lip seal 23, the flow channel 25 moves from one side of the running continuous web 3 to the second side of the running continuous web 3.

A suction tube 26 with a suction opening 31 is furnished to that side of the continuous web 3 contacting the deflection rollers 12 and 13 in the vertical upwardly directed path of the continuous web 3, and a suction tube 27 with a suction opening 30 is furnished to an opposite side of the continuous web 3 in the same vertical upward section of the continuous web 3 between the deflection rollers 12 and 13. This means that the continuous web 3 experiences a suction action on its two sides in the area of the vertical upward section between rollers 12 and 13. Branch channels 28 and 29 are connected to the suction tubes 26 and 27, wherein the branch channels 28 and 29 are further connected to an exhaust line 32.

The exhaust line 32 is tangentially connected with a separator 33. A liquid line 36 with a pump 37 branches off from a floor connection piece 34 of the separator 33. A gas discharge line 38 branches off from a head connection piece 35 of the separator 33, wherein the gas discharge line 38 is connected to a vacuum port of a vacuum generator 39 driven by a drive 40. The additionally heated gas from the vacuum generator 39 is fed through a gas return line 41 into a distributor box 42 having exit nozzles 43 directed toward the continuous web 3. The present invention is not limited to the embodiment illustrated. It is conceivable that the method can be performed with only one single roller.

Figure 2:
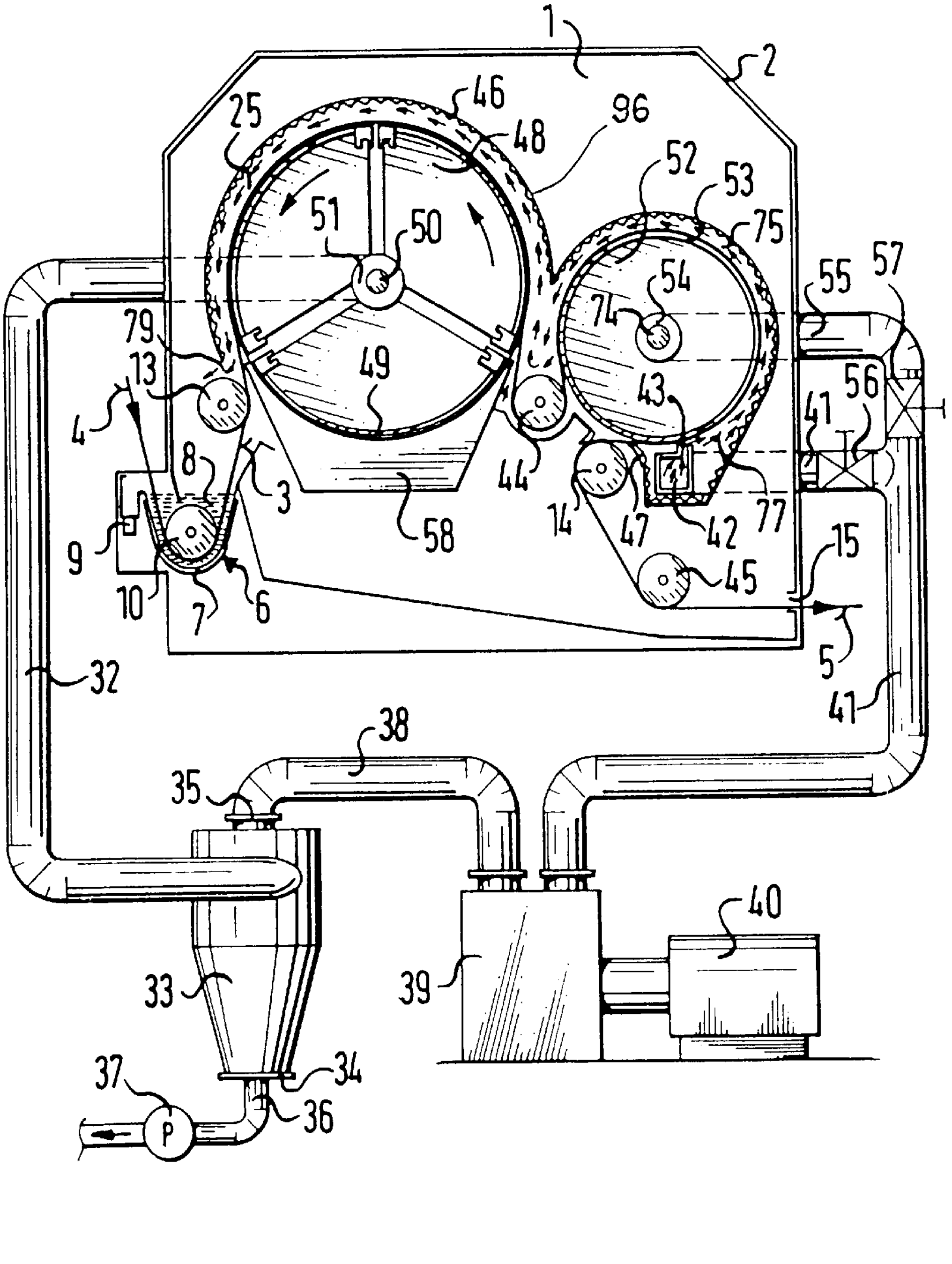
FIG. 2 is a view of a schematic diagram of an arrangement for treating elastic textile fabrics with vacuum.

During the treatment, in particular the drying of a continuous web 3 made of elastic textile fabric or of knitted fabric, according to FIG. 2, two rollers 48 and 52, furnished with sieve jackets 49 and 53, are disposed between the deflection rollers 13 and 14, and a deflection roller 44 is disposed between the rollers 48, 52. The rollers 48 and 52 are rotating in the same direction. The diameter of the roller 48 can be from about 3 to 10 times and preferably 5 to 7 times the diameter of the rollers 13 and 14. The diameter of the roller 52 can be from about 2 to 10 times and preferably 3 to 5 times the diameter of the rollers 13 and 14. The distance of the surface of the roller 48 from the surface of the roller 52 is from about 0.03 times the diameter of the roller 48 to 0.2 times the diameter of the roller 48 and is preferably from about 0.08 to 0.12 times the diameter of the roller 48. The deflection angle of the continuous web 3 around the roller 48 is from about 200 to 300 degrees and preferably from about 220 to 240 degrees. The deflection angle of the continuous web 3 around the roller 52 is from about 240 degrees to 330 degrees and preferably from about 280 degrees to 320 degrees. A further deflection roller 45 is furnished between the deflection roller 14 and the opening 15 on the discharge side. The roller 48 is furnished with a sieve jacket 49 as a suction roller according to the U.S. patent application, Ser. No. 08/542,389, filed Oct. 12, 1995, and the roller 52 with a sieve jacket 53 is formed as a sieve roller. The roller 52 can be heated and/or unheated. A heatable, double-walled sheet metal jacket 46 (according to the German patent document 44 16 645.1) is furnished above the rollers 48 and 52, wherein the sheet metal jacket 46 is adapted to the rollers and thus forms a flow channel 75. According to the embodiment of FIG. 2, the continuous web 3 faces the flow channel 75 throughout with the same side of the continuous web 3. In this case again, the inner side of the sheet metal jacket 46 is furnished with baffles 96. A lip seal 47 is furnished in the discharge region of the continuous web 3. The lip seal 47 seals the space between the outer face of the continuous web 3 running on the roller 52 relative to the sheet metal jacket 46. The roller 48 is furnished with a roller axis 50 and the roller 52 is furnished with a roller axis 74. An axial exhaust 51 is furnished in the region of the roller axis 50, and an axial feed 54 is furnished in the region of the roller axis 74. A branch line 55 is connected to the axial feed 54 and branches off from the gas return line 41. A valve 56 disposed in the branch of gas return line 41 connected to the entrance region 77, and valve 57 disposed in branch line 55 furnish an automatically controlled distribution of the returned gases between the entrance region 77 and the axial feed 54 in the region of the roller axis 74. A floor tub 58 is disposed below the rollers 48 and 52, and preferably below the rollers 48 and 44. The invention features are not limited to those associated with the present embodiment, because it is conceivable to perform the method with only one single roller.

All rollers 16, 17 as well as 48 and 52 are furnished with sealed front walls, not illustrated. It is easily possible to employ suction or sieve rollers in the embodiment according to FIG. 1.

The flow channels 25 and 75 are absolutely sealed from the entrance region 76 or, respectively, 77 of the gases up to the exit or discharge region 78 or, respectively, 79 of the gases and exhaust vapors such that a uniform flow of the gases and exhaust vapors is assured through the flow channel 25, 75.

According to the embodiment of FIG. 1, the gases and exhaust vapors leave the flow channel 25 together and pass through the discharge region 78 into the region of the suction tubes 26 and 27. The gases and exhaust vapors are sucked through the suction openings 30, 31 by way of a vacuum into the exhaust line 32 and pass from there into the separator 33. The gases and the liquid are separated from each other in the separator 33. The separated water passes through the floor connection piece 34 into the liquid line 36 with the pump 37, and is led to a further user. The separated gas is sucked from the separator 33 through the head connection piece 35 and the gas exhaust line 38 into the vacuum generator 39; the separated gas is heated in the vacuum generator 39 and is led into the distributor box 42 by way of the gas return line 41. The nozzle openings 43 are aligned over the complete width of the continuous web 3 such that the returned gases are uniformly distributed over the complete width of the continuous web 3 and are blown onto the complete width of the continuous web 3. The gases pass from here in a uniformly turbulent flow together with the exhaust vapors through the flow channel 25 into the discharge region 78.

According to the embodiment of FIG. 2, the returned gases are led through the gas return line 41 and the branch line 55 into the treatment chamber 1. The partial volumes of gas can be subdivided as desired onto the line 41, 55 by way of the valves 56, 57. A part of the gases is led through the distributor box 42 and through the exit nozzles 43 onto the continuous web 3 and thus into the flow channel 75 according to the embodiment of FIG. 2. The remaining part of the gases passes through the branch line 55 into the axial feed 54, and from there through the sieve jacket 53 into the flow channel 75. The flow channel 75 is completely sealed from the entrance region 77 up to the exit or discharge region 79. The gases together with the formed exhaust vapors are sucked through the sieve jacket 49 of the roller 48 into the interior of the roller 48 and then over the axial exhaust 51 into the branch line 32. The further treatment is performed as already described above.

Figure 3:
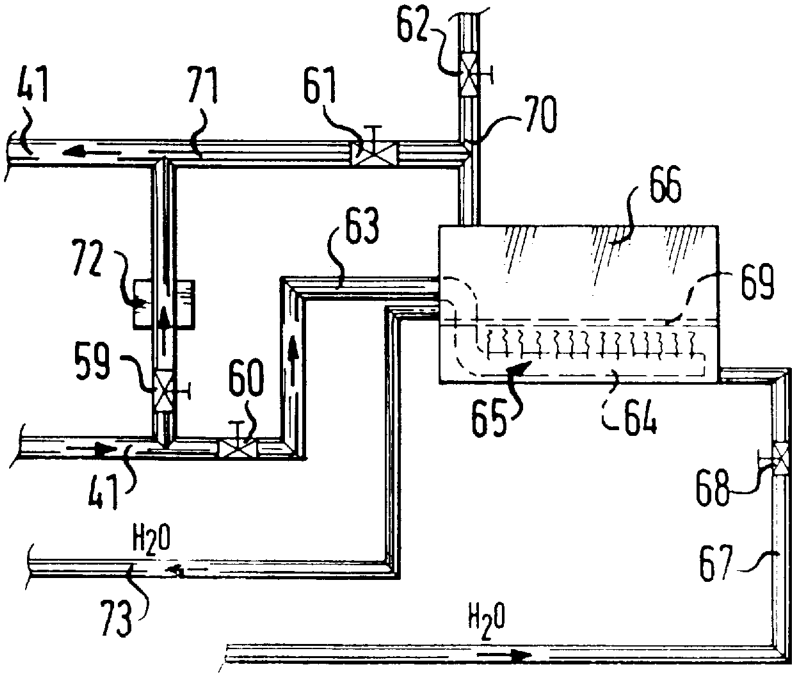
FIG. 3 is a view of a further embodiment showing a recovery of exhaust heat in a heat exchanger.

According to FIG. 3, a part or the complete gas heated in the vacuum generator 39 is led through a line 63 into the region of the floor of a heat exchanger 66 filled with water. The pipe 64, running over the floor of the heat exchanger, is furnished with exit nozzles 65. The valve 59, when in open position, allows a flow of the gas from the vacuum generator to the distributor box 42. The valve 60, when in open position, allows a flow of the gas to line 63. The valves 59 and 60 allow an automatically controlled distribution. The water, for example fresh water, is led through a line 67 having a valve 68 into the heat exchanger 66. The distributor plate 69 with microfine openings disperses the gases with the fresh water, with an optimum heat transfer from the gas to the fresh water. Microfine openings within the context of the present application refer to uniformly distributed openings of a diameter of from 0.02 mm to 2.00 mm. The distributor plate 69 furnishes a uniform distribution of the mixture of gas and fresh water exiting from the nozzles 65. The heated water is passed through the line 73 to a further user. The further user can be the treatment chamber or, alternatively, another location in the plant. The exhaust air present is led into the ambient open air through the line 70. In addition, the exhaust air can be led through a line 71 into the gas return line 41. Valves 61 and 62 take care of a corresponding distribution.

In case of closed valves 60 and 61 and an open valve 59, the gas leaving the vacuum generator 39 is returned completely into the treatment chamber 1. In case of a closed valve 59 and an open valve 60, the gas passes completely into the heat exchanger 66. The valves 59 and 60 can be automatically controlled such that parts of the gas are led into the treatment chamber 1 or, respectively, into the heat exchanger 66. In case of an open valve 62 and a closed valve 61, the exhaust air is vented completely into the ambient open air. In case of an open valve 61 and a closed valve 62, the complete exhaust air is led into the gas return line 41. The exhaust air can also be led through the line 70 and 71 in case of a corresponding automatic control of the valves 61 and 62.

It will be understood that each of the elements described above, or two or more together, may also find a useful application in other types of apparatus for treatment of a continuous web differing from the types described above.

While the invention has been illustrated and described as embodied in the context of an apparatus for treatment of a continuous web with vacuum, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A method of treatment of an endless web of textile material comprising guiding the endless web over a first rotating roller and a second rotating roller, disposed in series in advance moving direction of the endless web disposed within a treatment chamber for drying the endless web, and wherein the second rotating roller is a rear rotating roller;

withdrawing generated exhaust vapors;

separating the withdrawn and generated exhaust vapors in a separator into gas and liquid;

returning the liquid resulting in the separator into the treatment chamber;

passing the gases resulting in the separator to a vacuum generator;

returning the gases, released by the vacuum generator at a discharge region of the endless web in the area of the rear rotating roller, into a treatment region.

2. The method according to claim 1, further comprising spraying the returned gases with nozzles onto the endless web;

passing the returned gases in a direction oppositely to the advance moving direction of the endless web from the discharge region of the endless web up to an entrance region of the endless web through a heated flow channel surrounding the first rotating roller and the second rotating roller and sealed towards the outside; and withdrawing the returned gases after exiting from this flow channel together with the generated exhaust vapors.

3. The method according to claim 1, further comprising, operating rollers guiding the endless web without supplying heat to the first rotating roller and the second rotating roller;

entering gas released from the vacuum generator into a heat exchanger furnished with a water feed;

generating hot liquid by transferring heat from the gas released from the vacuum generator to the water; and venting generated exhaust air into the ambient open air.

4. The method according to claim 1, further comprising generating heat at the rear rotating roller guiding the endless web for drying the endless web;

wherein the first rotating roller is a front rotating roller, and further comprising deflecting the endless web in an entrance region of the endless web onto the front rotating roller;

passing the endless web over an exhaust tube;

sucking off exhaust vapors from the endless web with the exhaust tube.

5. The method according to claim 1, further comprising forming one of the first rotating roller and the second rotating roller as a suction roller;

axially withdrawing exhaust vapors from the suction roller;

entering returned gases into an axial region of the rear rotating roller.

6. A method of treatment of an endless web of textile material, where the endless web is led over deflection rollers within a treatment chamber, wherein generated exhaust vapors are withdrawn by way of a vacuum and are separated by a separator into gas and liquid, wherein the liquid is returned into the treatment chamber, wherein, for drying a textile web, the endless web is led over a first rotating roller and a second rotating roller, disposed in series in advance moving direction of the endless web, wherein the second rotating roller is a rear rotating roller, wherein the exhaust vapors are withdrawn by a vacuum generator, wherein the exhaust vapors are passed through the separator, where the gases are passed from the separator to the vacuum generator and are then returned at a discharge region of the endless web by the rear rotating roller into a treatment region.

7. The method according to claim 6, wherein the returned gases are passed in a direction oppositely to the advance moving direction of the endless web from the discharge region of the endless web up to the entrance region of the endless web through a heated flow channel, surrounding the first rotating roller and the second rotating roller and sealed towards the outside, and wherein the returned gases are withdrawn after exiting from this flow channel together with the formed exhaust vapors;

wherein the returned gases are sprayed with nozzles onto the endless web;

wherein the gas, withdrawn from the vacuum generator, is completely or in part returned into the treatment chamber;

wherein the first rotating roller and the second rotating roller are operated without heating.

8. The method according to claim 6, wherein the gas, withdrawn from the vacuum generator, is completely or in part entered into a heat exchanger furnished with a water feed, and wherein the thereby generated hot liquid is completely or in part passed to a user, and wherein the generated exhaust air is completely or in part vented into the ambient open air;

wherein the the first rotating roller and the second rotating roller are furnished with heating and are operated as drying cylinders;

wherein the exhaust vapors are sucked off from the endless web by way of one or several exhaust tubes, wherein the first rotating roller is a front rotating roller, wherein the endless web passes in the entrance region of the endless web onto the front rotating roller, and wherein the endless web runs over the exhaust tubes.

9. The method according to claim 6 for treating an endless web of elastic knitted fabric, wherein the exhaust vapors are axially withdrawn from the first rotating roller upon formation of the first rotating roller and the second rotating roller as suction rollers or sieve rollers, and wherein the returned gases or parts of the returned gases are entered into the axis of the rear rotating roller;

wherein at least one of the first rotating roller and of the second rotating roller is furnished without heating, and wherein at least the second rotating roller is operated as a heated drying cylinder.

10. An apparatus for treating an endless web of textile material led over deflection rollers within a treatment chamber, including a treatment chamber;

a plurality of deflection rollers disposed within the treatment chamber for guiding and treating the endless web;

a first rotating roller, disposed in series as seen in advance moving direction of the endless web between the deflection rollers, for guiding and treating the endless web and for drying of the endless web;

an exhaust device connected to the treatment chamber for discharging formed exhaust gases;

an exhaust line connected to the exhaust device;

a separator connected to the exhaust line for withdrawing the formed exhaust gases;

a gas exhaust line connected to a head of the separator;

a liquid line connected to a floor of the separator;

a pump disposed in the liquid line and feeding a connection of the liquid line to the treatment chamber;

a vacuum generator connected to the gas exhaust line; and a gas return line connected to the vacuum generator and to the treatment chamber.

11. The apparatus according to claim 10, further comprising a distributor box with exit nozzles disposed at an end of the gas return line on a side of the treatment chamber, wherein exit openings of the exit nozzles are directed onto the endless web;

a second rotating roller sequentially following to the first rotating roller;

a heatable double-walled sheet metal jacket having baffles disposed inside the sheet metal jacket surrounding the first rotating roller at a distance and surrounding the second rotating roller at a distance and thereby forming a flow channel between the rotating rollers and the sheet metal jacket;

a first lip seal furnished to the sheet metal jacket of the second rotating roller in a region of a discharge of the endless web;

a second lip seal furnished to the sheet metal jacket of the second rotating roller at an input of an endless web entrance region of the second rotating roller;

a third lip seal furnished to the sheet metal jacket of the second rotating roller at an output of an endless web exit region of the first rotating roller.

12. The apparatus according to claim 10, further comprising a second rotating roller sequentially following to the first rotating roller, wherein the first rotating roller and the second rotating roller are formed as sieve rollers, wherein the exhaust device is coordinated to the endless web in a region of the first rotating roller, wherein the exhaust device is connected to the exhaust line through branch channels, wherein one of the deflection rollers is furnished between the first rotating roller and the second rotating roller in a lower part of the treatment chamber;

an axial exhaust furnished to the first rotating roller;

an axial feed furnished to the second rotating roller;

a heatable, double-walled sheet metal jacket having baffles disposed inside the sheet metal jacket and adapted to the rotating rollers, thereby forming a flow channel in an upper part between the first rotating roller, the second rotating roller, and the sheet metal jacket, and said sheet metal jacket surrounding the first rotating roller and the second rotating roller at a distance;

a floor tub covering a lower part of the first rotating roller and of the second rotating roller;

a branch line branching off from the gas return line, and wherein the branch line is led to the axial feed of the second rotating roller;

a first valve placed in the gas return line;

a second valve placed in the branch line;

a distributor box disposed inside the sheet metal jacket.

13. The apparatus according to claim 10, further comprising a second branch line branching off from the gas return line;

a heat exchanger, wherein the second branch line connects by way of a perforated tube to a floor of the heat exchanger;

a fresh water feed connected to the heat exchanger for feeding fresh water to the heat exchanger;

a distributor plate having microfine openings for generating a fine distribution of the gas from the gas return line with the fresh water from the fresh water feed;

a discharge line for hot liquid is connected to the heat exchanger in a region of the distributor plate;

an exhaust air line connected to the heat exchanger and led above the distributor plate into the ambient open air;

a third branch line branching off from the exhaust air line; and a connection line connecting the third branch line to the gas return line.

14. An apparatus for treating an endless web of textile material led over deflection rollers within a treatment chamber, including a treatment machine for treating an endless web, which is led over deflection rollers within the treatment chamber, and wherein an exhaust device is connected to the treatment chamber for discharging the formed exhaust vapors, wherein a first rotating roller and a second rotating roller (16, 17, 48, 52) are disposed successively in series as seen in advance moving direction of the endless web between the deflection rollers (10 through 14, 44, 45) for guiding and treating the endless web and for drying the endless web, wherein an exhaust line (32) is connected to a separator (33) for withdrawing the formed exhaust gases, wherein the separator (33) is connected at its head to a gas exhaust line (38), and wherein the separator (33) is connected at its floor (34) to a liquid line (36), wherein the gas exhaust line (38) is connected to a vacuum generator (39), and wherein the liquid line (36) furnished with a pump (37) is connected to a user (1), and wherein a gas return line (41) is disposed between the vacuum generator (39) and the treatment chamber (1).

15. The apparatus according to claim 14, wherein an end of the gas return line (41) on the treatment side of the chamber is furnished with a distributor box (42) with exit nozzles (43), wherein exit openings of the exit nozzles (43) are directed onto the endless web (3);

wherein the rollers (16, 17) are surrounded at a distance in each case by a heatable double-walled sheet metal jacket (20, 21) having baffles (96) disposed inside the sheet metal jacket (20, 21), thereby forming a flow channel (25) between the first rotating roller, the second rotating roller (16, 17) and the sheet metal jacket (20, 21), wherein the sheet metal jacket (20) of the first roller (16) is furnished with a lip seal (22) in a discharge region of the endless web (3), wherein the second rotating roller is a rear rotating roller, and wherein the sheet metal jacket (21) of the rear rotating roller (17) is furnished with a lip seal (23) at an input side entrance region, and wherein the sheet metal jacket (21) is furnished with a lip seal (24) at an output side exit region of the endless web (3).

16. The apparatus according to claim 14, wherein one or several exhaust pipes (26, 27) are coordinated to the endless web (3) in a region of the first rotating roller (16), wherein the exhaust pipes (26, 27) are connected to the exhaust line (32) through branch channels (28, 29).

17. The apparatus according to claim 14, wherein the endless web is an endless web of elastic knitted fabric, wherein the first rotating roller and the second rotating roller (48, 52) are surrounded at a distance with a heatable, double-walled sheet metal jacket (46) having baffles disposed inside the sheet metal jacket (46) and adapted to the first rotating roller and the second rotating roller (48, 52), thereby forming a flow channel (75) in the upper part between the first rotating roller and the second rotating roller (48, 52) and the sheet metal jacket (46), wherein the lower part of the first rotating roller and the second rotating roller (48, 52) is covered by a floor tub (58), and wherein a further deflection roller (44) is provided between the first rotating roller and the second rotating roller (48, 52) in the lower part;

wherein the first rotating roller and the second rotating roller (48, 52) are formed as suction rollers or sieve rollers, wherein the first rotating roller is a front roller, and wherein the front roller (48) is furnished with an axial exhaust (51), and wherein the rear rotating roller (52) is furnished with an axial feed (54);

wherein a branch line (55) branches off from the gas return line (41), wherein the branch line (55) is led to the axial feed (54) of the roller (52), and wherein the gas return line (41) and the branch line (55) are in each case furnished with a valve (56, 57).

18. The apparatus according to claim 14, further comprising a distributor box (42) disposed inside a sheet metal jacket (21 or, respectively, 46);

wherein a further branch line (63) branches off from the gas return line (41), wherein the further branch line (63) enters by way of a perforated tube (64) into a floor of a heat exchanger (66) with a fresh water feed (67) and furnished with a distributor plate (69) having openings, wherein a discharge line (73) for hot liquid is furnished in a region of the distributor plate (69);

wherein an exhaust air line (70) is furnished and led above the distributor plate (69) into the ambient open air;

wherein the distributor plate (69) is furnished with microfine openings.

19. The apparatus according to claim 18, wherein a branch line (71) branches off from the exhaust air line (70), wherein the branch line (71) is connected to the gas return line (41).

* * * * *